US007936741B2

(12) United States Patent
Vimpari et al.

(10) Patent No.: US 7,936,741 B2
(45) Date of Patent: May 3, 2011

(54) DYNAMIC UPLINK CONTROL CHANNEL GATING TO INCREASE CAPACITY

(75) Inventors: Anna-Mari Vimpari, Oulu (FI); Esa Malkamäki, Espoo (FI); Jukka Nauha, Oulu (FI); Karri Ranta-Aho, Espoo (FI)

(73) Assignee: Nokia Corporation, Espoo (FI)

( * ) Notice: Subject to any disclaimer, the term of this patent is extended or adjusted under 35 U.S.C. 154(b) by 1053 days.

(21) Appl. No.: 11/499,850

(22) Filed: Aug. 4, 2006

(65) Prior Publication Data
US 2007/0030839 A1 Feb. 8, 2007

Related U.S. Application Data

(60) Provisional application No. 60/705,828, filed on Aug. 5, 2005.

(51) Int. Cl.
*H04B 7/216* (2006.01)
(52) U.S. Cl. ..... 370/342; 370/335; 455/450; 455/452.1; 455/522; 455/69
(58) Field of Classification Search .................. 370/328, 370/338, 335, 342, 401; 455/450–452.2, 455/502
See application file for complete search history.

(56) References Cited

U.S. PATENT DOCUMENTS

| 5,768,269 | A * | 6/1998 | Rakib et al. ..................... 370/342 |
| 5,940,006 | A * | 8/1999 | MacLellan et al. .......... 340/10.1 |
| 6,108,560 | A * | 8/2000 | Navaro et al. ................. 455/517 |
| 6,226,301 | B1 * | 5/2001 | Cheng et al. ................... 370/474 |
| 6,549,785 | B1 * | 4/2003 | Agin ............................. 455/522 |
| 6,724,742 | B1 * | 4/2004 | Mun et al. ...................... 370/335 |
| 6,747,963 | B1 * | 6/2004 | Park et al. ...................... 370/335 |
| 6,836,666 | B2 * | 12/2004 | Gopalakrishnan et al. .......................... 455/452.2 |
| 6,917,607 | B1 * | 7/2005 | Yeom et al. .................... 370/342 |
| 7,013,143 | B2 * | 3/2006 | Love et al. ..................... 455/450 |
| 7,161,916 | B2 * | 1/2007 | Malladi et al. ................ 370/332 |
| 7,310,499 | B2 * | 12/2007 | Magnusson et al. ........... 455/69 |
| 7,319,718 | B2 * | 1/2008 | Roh et al. ...................... 375/224 |
| 7,392,014 | B2 * | 6/2008 | Baker et al. ................. 455/67.11 |
| 7,428,406 | B2 * | 9/2008 | Raaf ............................ 455/63.4 |
| 7,447,504 | B2 * | 11/2008 | Lohr et al. .................... 455/450 |
| 2002/0145991 | A1 * | 10/2002 | Miya et al. .................... 370/337 |
| 2003/0013451 | A1 * | 1/2003 | Walton .......................... 455/447 |
| 2004/0017792 | A1 | 1/2004 | Khaleghi et al. |
| 2004/0219920 | A1 * | 11/2004 | Love et al. .................... 455/442 |
| 2005/0213575 | A1 * | 9/2005 | Shin et al. ..................... 370/389 |
| 2006/0251014 | A1 * | 11/2006 | Castor et al. ................. 370/329 |

(Continued)

FOREIGN PATENT DOCUMENTS
EP 1420538 5/2004
(Continued)

OTHER PUBLICATIONS

3GPP TR 25.840 V4.0.0 (Dec. 2003) Technical Specification Group Radio Access Network; Terminal power saving features.

(Continued)

*Primary Examiner* — Sharad Rampuria (57) ABSTRACT

The specification and drawings present a new method, system, apparatus and software product for dynamic gating of an uplink (UL) control channel, e.g., dedicated physical control channel (DPCCH) for increasing capacity of communications, e.g., wireless communications, wherein said gating is defined, using a predetermined criterion, by instructions provided by a network and by a transmission gap in a discontinuous data signal, e.g., transmitted on an enhanced dedicated channel (E-DCH).

33 Claims, 4 Drawing Sheets

U.S. PATENT DOCUMENTS

| | | | |
|---|---|---|---|
| 2007/0189237 A1* | 8/2007 | Jaatinen et al. | 370/335 |
| 2007/0286155 A1* | 12/2007 | Kaikkonen et al. | 370/350 |
| 2008/0043681 A1* | 2/2008 | Vimpari et al. | 370/335 |
| 2008/0214196 A1* | 9/2008 | Sambhwani et al. | 455/446 |
| 2009/0168731 A1* | 7/2009 | Zhang et al. | 370/336 |
| 2009/0303977 A1* | 12/2009 | Hsu et al. | 370/345 |
| 2010/0157895 A1* | 6/2010 | Pani et al. | 370/328 |

FOREIGN PATENT DOCUMENTS

| | | |
|---|---|---|
| JP | 2003-511898 | 3/2003 |
| JP | 2003-163962 | 6/2003 |
| JP | 2006-295980 | 10/2006 |
| WO | WO 0062435 | 10/2000 |
| WO | WO 01/26269 | 4/2001 |
| WO | WO 0199313 | 12/2001 |
| WO | WO 02087274 | 10/2002 |
| WO | WO 2005/015940 | 2/2005 |
| WO | WO 2006/114701 | 2/2006 |

OTHER PUBLICATIONS

3GPP TR 25.214 V6.0.0 (Jun. 2005) Technical Specification Group Radio Access Network; Physical layer procedures (FDD).

"Gated Control Channel Transmission in WCDMA Forward Link" by Sami Salonen, Master's thesis, University of Oulu, Finland, 2002.

TR 101 112 V3.2.0. (Apr. 1998) UMTS 30.03 version 3.2.0, Universal Mobile Telecommunications System (UMTS); Selection procedures for the choice of radio transmission technologies of the UMTS (UMTS 30.03 version 3.2.0.).

7 pages European 06779933.8 Extended Search Report dated Oct. 23, 2009.

English Translation of Abstract for JP 2003-163962.

English Translation of Abstract for JP 2006-295980.

English Translation of Abstract for JP 2003-511898.

* cited by examiner

DYNAMIC UPLINK CONTROL CHANNEL GATING TO INCREASE CAPACITY

PRIORITY AND CROSS-REFERENCE TO RELATED APPLICATION

This application claims priority from U.S. Provisional Patent Application Ser. No. 60/705,828, filed Aug. 5, 2006.

TECHNICAL FIELD

This invention generally relates to communications, e.g., wireless communications, and more specifically to dynamic gating of an uplink (UL) control channel such as dedicated physical control channel (DPCCH).

BACKGROUND ART

In an uplink (a direction from a user equipment to a network), when no dedicated channels (DCHs) and no corresponding dedicated physical data channels (DPDCHs) are configured, all data is transmitted on an enhanced dedicated channel (E-DCH) which is mapped to an enhanced dedicated physical data channel (E-DPDCH). Control signaling associated with the E-DCH is transmitted on an enhanced dedicated physical control channel (E-DPCCH). The E-DPDCH and E-DPCCH can be discontinuous and are transmitted only when there is data to be transmitted and the transmission has been granted by the network. In the uplink, in addition to the E-DPDCH and E-DPCCH, a continuous dedicated physical control channel (DPCCH) and possibly a continuous or discontinuous dedicated physical control channel (e.g., an uplink high speed dedicated physical control channel, HS-DPCCH) for an HS-DSCH (high speed downlink shared channel) are transmitted.

A packet service session contains one or several packet calls depending on the application as described in ETSI standard, TR 101 112, UMTS 30.03 "Selection procedures for the choice of radio transmission technologies of the UMTS", version 3.2.0. The packet service session can be considered as an NRT (non-real time) radio access bearer duration and the packet call as an active period of packet data transmission. During the packet call several packets may be generated, which means that the packet call constitutes a bursty sequence of packets. The burstiness is a characteristic feature of the packet transmission.

The arrival of session set-ups to the network can be modeled as a Poisson process. Reading time starts when the last packet of the packet call is completely received by the user/network and ends when the user makes a request for the next packet call. The E-DCH transmission in the uplink is discontinuous during a reading time, such that during most of the reading time there is no E-DCH transmission. Note, that depending on the packet arrival intervals (among other things), there could be gaps in the E-DCH) transmission during a packet call but the E-DCH transmission might also be continuous during the packet call. Thus, there can be some inactivity on the E-DCH also during a packet call.

In a UL direction from a user equipment (UE) to a network, also a signal on a high speed dedicated physical control channel (HS-DPCCH) can be transmitted. The HS-DPCCH signal typically carries 2 slots with channel quality indicator (CQI) reporting information and 1 slot with ACK/NACK information for the HSDPA. CQI transmission is typically periodic and normally independent of the HS-DSCH transmission activity. CQI reporting period can be controlled by a radio network controller (RNC) with possible values of 0, 2, 4, 8, 10, 20, 40, 80, and 160 ms. ACK/NACK is transmitted only as a response to a packet transmission on the HS-DSCH, which (similar to the E-DCH) is transmitted only when there is data to be transmitted and which depends on the reading time and packet arrival times during the packet call.

For the E-DCH transmission, a grant is needed: a non-scheduled grant for non-scheduled MAC-d (MAC stands for medium access control) flows and a serving grant (and allowed active hybrid automatic repeat request (HARQ) process) for a scheduled transmission. In the case of the scheduled MAC-d flows, a Node B controls when a user equipment (UE) is allowed to send and thus Node B knows when the UE may send data. For the non-scheduled MAC-d flows, the network can allow a maximum number of bits that can be included in a MAC-e PDU (protocol data unit) for the given MAC-d flows. In case of 2 ms E-DCH TTI (transmission timing interval), each non-scheduled grant is applicable for a specific set of HARQ processes indicated by an RRC (radio resource control), and RRC can also restrict the set of HARQ processes for which scheduled grants are applicable. Also there must be a sufficient transmit power available in the UE to transmit the intended number of bits with the power level needed for intended reliability of the transmission, except for a minimum set (defined by the network), which defines a number of bits that can be transmitted on the E-DCH in the TTI also when there is not enough transmit power to maintain the intended reliability. (This minimum set for the E-DCH may only exist if there is no DCH configured for the connection.)

The UL DPCCH carries control information generated at layer 1 (physical layer). The layer 1 control information consists of, e.g., known pilot bits to support channel estimation for coherent detection, transmit power control (TPC) for DL DPCH (dedicated physical channel), optional feedback information (FBI) and optional transport format combination indicator (TFCI). Typically, the UL DPCCH is continuously transmitted (even if there is no data to be transmitted for certain time periods), and there is one UL DPCCH for each radio link. The continuous transmission is not a problem with circuit switched services, which are typically sent continuously and thus also the control channel needs to be present continuously. However, for bursty packet services when there may be significant time durations when no user data is transmitted, continuous DPCCH transmission causes a significant overhead.

The uplink capacity can be increased by decreasing a control overhead. One possibility for decreasing the control overhead is UL DPCCH gating (or discontinuous transmission), i.e., not transmitting signals on the DPCCH all the time.

Rationale for using gating includes (but is not limited to):
  providing user equipment (UE) power savings and longer battery life;
  providing interference reduction; and
  providing higher capacity.

DISCLOSURE OF THE INVENTION

According to a first aspect of the invention, a method, comprises: scheduling, using a predetermined criterion, a discontinuous control signal for an uplink control channel depending on instructions and on a transmission gap length in a discontinuous data signal on a data channel; and transmitting the discontinuous control signal to the network element by a user equipment.

According further to the first aspect of the invention, the instructions may be at least one of: a) predefined rules, and b) instructions provided by the network element.

According further to the first aspect of the invention, the instructions may comprise at least one of: a maximum limit for a gap period or a gap length for the control channel transmission, a minimum limit for a gap period or a gap length for the control channel transmission, timing of the control channel transmission, a duration of the control channel transmission, a maximum transmission gap in a discontinuous data signal on a data channel still requiring an uplink control channel transmission, a minimum transmission gap in the discontinuous data signal requiring continuous control channel transmission, and an algorithm, according to which the discontinuous control signal for an uplink control channel depends on the discontinuous data signal on the data channel.

Still further according to the first aspect of the invention, the discontinuous control channel may be an uplink dedicated physical control channel and the data channel is an uplink enhanced dedicated channel.

According further to the first aspect of the invention, the network element may be a Node B, and the network element and the user equipment may be configured for wireless communications.

According still further to the first aspect of the invention, during the scheduling, the gating of the discontinuous control signal may further depend on timing of a further report signal comprising channel quality indicator reporting information regarding a downlink channel and sent to the network element by the user equipment.

According further still to the first aspect of the invention, during the scheduling, a gating period of the discontinuous control signal may be changed by a pre-selected value after a pre-selected time period of a transmission inactivity of the discontinuous data signal, and after transmitting the discontinuous data signal again, the gating period may be changed to its initial predefined value.

According yet further still to the first aspect of the invention, during the scheduling, a gating period of the discontinuous control signal may be increased by a pre-selected value after every pre-selected time period of a transmission inactivity of the discontinuous data signal, wherein the gating period cannot exceed a pre-selected maximum value.

Yet still further according to the first aspect of the invention, during the scheduling, a gating period of the discontinuous control signal may be increased to a pre-selected maximum value after a pre-selected time period of a transmission inactivity of the discontinuous data signal.

Still yet further according to the first aspect of the invention, during the scheduling, a time duration of the discontinuous control signal may be adjusted according to a further predetermined criterion.

Still further still according to the first aspect of the invention, the time duration of the discontinuous control signal may be increased by a pre-selected value after every pre-selected time period of a transmission inactivity of the discontinuous data signal, wherein the time duration cannot exceed a pre-selected maximum value.

According further still to the first aspect of the invention, during the scheduling, a timing of gating of the discontinuous control signal relative to the discontinuous data signal may be determined according to a predetermined algorithm and depends on the discontinuous data signal.

According yet further still to the first aspect of the invention, a gating period of the discontinuous control signal may be an average or a maximum allowed gap length in a randomized transmission pattern of the discontinuous control signal.

Still yet further according to the first aspect of the invention, the scheduling may be provided by the network element or by the user equipment.

According to a second aspect of the invention, a computer program product comprising: a computer readable storage structure embodying computer program code thereon for execution by a computer processor with the computer program code, wherein the computer program code comprises instructions for performing the first aspect of the invention indicated as being performed by any component or a combination of components of the user equipment or the network element.

According to a third aspect of the invention, a user equipment, comprises: an uplink scheduling and signal generating module, for generating a discontinuous control signal; a receiving/transmitting/processing module, for transmitting the discontinuous control signal to the network element, wherein scheduling of the discontinuous control signal is provided, using a predetermined criterion, depending on instructions and on a transmission gap length in a discontinuous data signal on a data channel.

Further according to the third aspect of the invention, the uplink scheduling and signal generating module may be configured to provide the scheduling.

Still further according to the third aspect of the invention, the scheduling may be provided by the network element using the instructions.

According further to the third aspect of the invention, the instructions may be one of: a) predefined rules, and b) instructions provided by the network element.

According still further to the third aspect of the invention, the instructions may be provided by the network element and may comprise at least one of: a maximum limit for a gap period or a gap length for the control channel transmission, a minimum limit for a gap period or a gap length for the control channel transmission, timing of the control channel transmission, a duration of the control channel transmission, a maximum transmission gap in a discontinuous data signal on a data channel still requiring an uplink control channel transmission, and a minimum transmission gap in the discontinuous data signal requiring continuous control channel transmission, and an algorithm, according to which the discontinuous control signal for an uplink control channel depends on the discontinuous data signal on the data channel.

According yet further still to the third aspect of the invention, the discontinuous control channel may be an uplink dedicated physical control channel and the data channel is an uplink enhanced dedicated channel.

According further still to the third aspect of the invention, during the scheduling, the gating of the discontinuous control signal may further depend on timing of a further report signal comprising channel quality indicator reporting information regarding a downlink channel and sent to the network element by the user equipment.

Yet still further according to the third aspect of the invention, during the scheduling, a gating period of the discontinuous control signal may be changed by a pre-selected value after a pre-selected time period of a transmission inactivity of the discontinuous data signal, and after transmitting the discontinuous data signal again, the gating period may be changed to its initial predefined value.

Still yet further according to the third aspect of the invention, during the scheduling, a gating period of the discontinuous control signal may be increased by a pre-selected value after every pre-selected time period of a transmission inactivity of the discontinuous data signal, wherein the gating period cannot exceed a pre-selected maximum value.

Still further still according to the third aspect of the invention, during the scheduling, a time duration of the discontinuous control signal may be adjusted according to a further predetermined criterion.

Yet still further according to the third aspect of the invention, during the scheduling, a timing of gating of the discontinuous control signal relative to the discontinuous data signal may be determined according to a predetermined algorithm and depends on the discontinuous data signal.

Still yet further still according to the third aspect of the invention, a gating period of the discontinuous control signal may be an average or a maximum allowed gap length in a randomized transmission pattern of the discontinuous control signal.

According further to the third aspect of the invention, the user equipment may be configured for wireless communications.

According further yet to the third aspect of the invention, an integrated circuit may comprise the uplink scheduling and signal generating module and the receiving/transmitting/processing module.

According to a fourth aspect of the invention, a user equipment comprises: means for signal generation, for generating a discontinuous control signal; means for receiving and transmitting, for transmitting the discontinuous control signal to the network element, wherein scheduling of the discontinuous control signal is provided, using a predetermined criterion, depending on instructions and on a transmission gap length in a discontinuous data signal on a data channel.

According further to the fourth aspect of the invention, the means for signal generation may be configured to provide the scheduling.

According to a fifth aspect of the invention, a network element, comprises: a transmitter block, for transmitting instructions for scheduling a discontinuous control signal to a user equipment; and a receiving block, for receiving a discontinuous data signal and the discontinuous control signal, wherein scheduling of the discontinuous control signal is provided, using a predetermined criterion, depending on the instructions and on a transmission gap length in the discontinuous data signal on a data channel.

According further to the fifth aspect of the invention, the instructions may comprise at least one of: a maximum limit for a gap period or a gap length for the control channel transmission, a minimum limit for a gap period or a gap length for the control channel transmission, timing of the control channel transmission, a duration of the control channel transmission, a maximum transmission gap in a discontinuous data signal on a data channel still requiring an uplink control channel transmission, and a minimum transmission gap in the discontinuous data signal requiring continuous control channel transmission.

According to a sixth aspect of the invention, a communication system, comprises: a user equipment, for transmitting a discontinuous control signal for an uplink control channel, a network element, for receiving the discontinuous control signal, wherein scheduling of the discontinuous control signal is provided, using a predetermined criterion, depending on instructions and on a transmission gap length in a discontinuous data signal on a data channel.

According further to the sixth aspect of the invention, the instructions may be one of: a) predefined rules, and b) instructions provided by the network element.

Further according to the sixth aspect of the invention, the instructions may be provided by the network element and comprise at least one of: a maximum limit for a gap period or a gap length for the control channel transmission, a minimum limit for a gap period or a gap length for the control channel transmission, timing of the control channel transmission, a duration of the control channel transmission, a maximum transmission gap in a discontinuous data signal on a data channel still requiring an uplink control channel transmission, and a minimum transmission gap in the discontinuous data signal requiring continuous control channel transmission, and an algorithm, according to which the discontinuous control signal for an uplink control channel depends on the discontinuous data signal on the data channel.

Still further according to the sixth aspect of the invention, the scheduling may be provided by the network element or by the user equipment.

MODES FOR CARRYING OUT THE INVENTION

A new method, system, apparatus and software product are presented for dynamic gating of an uplink (UL) control channel, e.g., dedicated physical control channel (DPCCH), for increasing capacity of communications, e.g., wireless communications, wherein said gating is defined, using a predetermined criterion, by instructions (e.g., provided by a network) and by a transmission gap period in a discontinuous data signal, transmitted on a data channel such as an uplink enhanced dedicated channel (E-DCH). In other words, scheduling a discontinuous control signal (e.g., a DPCCH signal) for an uplink control channel (e.g., the (DPCCH)) can be performed depending on instructions and on a transmission gap length in the discontinuous data signal using a predetermined criterion. According to an embodiment of the present invention, the instructions can be predefined rules (e.g., according to a specification) and/or can be provided by the network element. The instructions can include (but not be limited to):

a) limits for a minimum and/or maximum gating period or a minimum and/or maximum gap length for said control channel transmission, e.g., a minimum and/or a maximum gating rate of the UL DPCCH transmission (i.e., providing boundaries for a gating period), b) timing of said control channel transmission, e.g., timing of the UL DPCCH transmission (e.g., comprising or partly comprising said predetermined criterion), c) a duration of said control channel transmission, e.g., a duration of said UL DPCCH transmission (if the UL DPCCH transmission is continuous or discontinuous before the gating is applied), d) a maximum transmission gap in a discontinuous data signal on a data channel requiring an uplink control channel transmission, e.g., after a long enough interval of data channel inactivity defined by the maximum transmission gap in the discontinuous data signal, the control channel transmission can stop, e) a minimum transmission gap in the discontinuous data signal requiring continuous control channel transmission, e.g., when the discontinuous data signal becomes very frequent which corresponds to the minimum transmission gap in the data signal, then the control channel transmission should be continuous in order to support the data signal rate, f) providing an algorithm defining a dependence (e.g., defining or partly defining the predetermined criterion) of the gating period or the transmission gap length of the uplink discontinuous control signal on the transmission gap length of the uplink discontinuous data signal, e.g., that after a predefined (e.g. 10 ms) inactivity in the uplink discontinuous data signal, the gating period for the uplink control channel can be increased (e.g. doubled) according to this algorithm or a predefined mapping between the transmission gap length on the discontinuous data signal and the gating period for the uplink control channel can be used according to this algorithm as well, etc.

It is noted that the gating rate is defined as an inverse of the gating period which is a time interval between starting instances of two consecutive transmissions on a channel of interest. A transmission gap length between these two consecutive transmissions is defined to be equal to the gating period minus the duration of the transmission, see FIG. 1.

Figure 1:
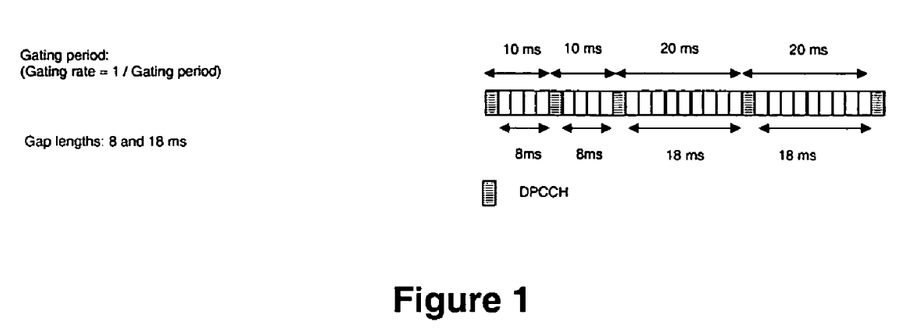
FIG. 1 is a diagram demonstrating definitions of a gap length, a gating period and a gating rate.

FIG. 1 shows the definitions for gap length, gating period and gating rate as examples, when it is assumed in this example that the duration of a DPCCH transmission is 2 ms during each gating period. First the gating period is 10 ms, i.e., the gating rate is 1/10 ms and after two periods, the gating period is doubled, and is 20 ms. When the gating period is 10 ms and the duration of DPCCH transmission is 2 ms, the gap length is 8 ms. When the gating period is 20 ms and the duration of DPCCH transmission is 2 ms, the gap length is 18 ms.

The UL DPCCH transmission in time slots, where neither E-DCH nor HS-DPCCH is transmitted, can be defined by a recent E-DCH transmission activity within limits of the instructions provided by a network element (e.g., the RNC), according to pre-defined rules described below in more detail.

For example, the RNC can define only the timing and limits (e.g., according to service requirements and according to an expected transmission rate) for a maximum transmission gap length for the guaranteed DPCCH transmission (i.e., the DPCCH transmission required from a user equipment (UE). The Node B and RNC typically would control the E-DCH transmission as currently specified, but the E-DCH transmission activity would define the DPCCH transmission gap length (or, e.g., the maximum DPCCH transmission gap length) during the E-DCH transmission gaps (the longer the data traffic inactivity, the longer the DPCCH transmission gap (or, e.g., the maximum DPCCH transmission gap), i.e., less control with lower data traffic activity and more control with higher data traffic activity) according to pre-defined rules within the RNC defined limits.

There are at least two possibilities among others for defining the gating: either network defines it exactly (i.e., providing the exact pattern, starting times, durations, etc.) and the UE simply follows this or some freedom is given to the UE. In the latter case, the network would only give some limits for the UE and within these limits and according to given rules, the UE could select when to transmit the DPCCH.

The latter case, where the UE is given more freedom, includes, e.g., a scheme where the UE stops transmitting the DPCCH when there is no other UL transmission (E-DCH or HS-DPCCH) and starts a counter. When the counter reaches a maximum value (signaled by the network), the UE sends a predetermined duration of the DPCCH signal and restarts the counter. If there is the E-DCH or HS-DPCCH transmission before the counter reaches the maximum allowed value, the DPCCH is naturally transmitted together with these other channels and the counter restarted. According to an embodiment of the present invention, this maximum allowed value of the counter could depend on the E-DCH activity (larger maximum with a less activity). Thus, in this case both the periodicity and the starting time of the DPCCH gaps would depend on the E-DCH activity. A combination of the cases includes, e.g. a scheme where the UE would autonomously adjust the gating period of the DPCCH signal depending on the E-DCH transmission activity, but the starting time of the gating pattern would be defined exactly by the network. Thus, in this case only the periodicity of the DPCCH gaps would depend on the E-DCH activity and the starting time of the DPCCH gating pattern would be independent from the E-DCH or HS-DPCCH transmission activity.

Especially in the SHO case, it may be possible to use the first alternative where the network (e.g., RNC) exactly tells the UE (and the Node Bs) the transmission pattern. Thus there is no uncertainty in the Node Bs when the UE will send (at least) the DPCCH (non-serving cells may miss some HS-DPCCH and E-DCH transmissions and thus some DPCCH transmissions, too).

Moreover, according to further embodiments of the present invention, the RNC can activate/inactivate the gating possibility and define said timing and limits for a (minimum) rate of required (guaranteed) DPCCH transmission. In addition, there can be a dynamic behavior according to the transmission activity (less control when lower data traffic activity, more control when higher data traffic activity): e.g., the DPCCH would be transmitted whenever the E-DCH or HS-DPCCH is transmitted, and an additional required DPCCH transmission (when the E-DCH or the HS-DPCCH is not transmitted) can depend on the E-DCH transmission activity/inactivity (the E-DCH transmission gap length). In other words, the gap length for the DPCCH transmission can depend on the E-DCH transmission activity: during inactivity, longer DPCCH transmission gaps and during frequent transmission, shorter DPCCH transmission gaps. Thus, during active E-DCH transmissions, the power control, channel estimation and synchronization would be supported with frequent DPCCH transmissions. The dynamic gap length could also be either an average or a maximum allowed gap length in a randomized DPCCH transmission pattern, if randomization is needed e.g., due to EMC (electromagnetic compatibility) problems.

The DPCCH gating rate limits and timing can be controlled by the RNC based on service requirements and possibly also on some kind of activity pattern detection. According to an embodiment of the present invention, the RNC would define the minimum and maximum rate (or equivalently the minimum and maximum gating period) for the DPCCH transmission: all cells would know these UL transmission times and there is no need for continuous DTX (discontinuous transmission) detection in the receiver side, i.e., the Node B knows when the gaps in the DPCCH transmission may occur. Moreover, the rules (known by the Node Bs and by the UE) for a gap length (or, e.g., maximum gap length) change can be, e.g., to double the DPCCH gap length or gating period after every fourth gap (or pre-selected number of gaps) in case of the E-DCH and DL/UL inactivity and if an RNC defined minimum DPCCH transmission rate is not yet reached. Furthermore, other rules can be: to double the DPCCH gap length or the gating period after a pre-selected number of transmission gaps in the E-DCH transmission, to double the gap length or the gating period after every pre-selected time period (e.g., a pre-selected number of milliseconds) of the E-DCH inactivity, to increase the DPCCH gap length or the gating period by a pre-selected number of slots after a pre-selected number of transmission gaps in the E-DCH transmission, or to increase the DPCCH gap length or the gating period by a pre-selected number of slots after every pre-selected time period (e.g., a pre-selected number of milliseconds) of the E-DCH inactivity, e.g., within the minimum and/or maximum limits for the DPCCH transmission gap length set by the RNC.

According to further embodiments of the present invention, the UL DPCCH gating pattern for the DPCCH transmission can be defined to be "on" all the time, and the timing could be independent from the E-DCH and HS-DPCCH transmissions, or the DPCCH gating pattern can restart after every E-DCH TTI transmission and thus, in this case, not only the rate but also the timing (starting time) of the DPCCH gated transmission pattern would depend on the E-DCH transmissions. In one embodiment, due to possible error cases (e.g. E-DPCCH/E-DPDCH transmission not detected by the Node B), the gating pattern for the DPCCH transmission can be "on" all the time, when gating is allowed, but not applied during the E-DCH and HS-DPCCH transmissions (i.e., the DPCCH transmission would always be continuous during the E-DCH and HS-DPCCH transmissions, even if the DPCCH gating pattern is "on"). Furthermore, the predefined gating pattern is beneficial from the non-scheduling cells point of view since they do not know when to expect the scheduled E-DCH transmission. The DPCCH gating pattern and the gap length increase rules should be designed so that the recovery from E-DPCCH DTX detection error would be possible.

According to an embodiment of the present invention, the duration of the DPCCH transmission between gaps can be, e.g., 1, 3, 5, 15 slots. This also can be a configurable parameter (e.g., decided by the RNC or by the Node B), e.g., using a further predetermined criterion. For example, the discontinuous control signal duration can be increased by a pre-selected value after every pre-selected time period of a transmission inactivity of the discontinuous data signal, wherein the time duration cannot exceed a pre-selected maximum value. Moreover, the DPCCH transmission can also follow a pseudo random pattern, e.g., 5 slots (or a predefined number of slots) in the DPCCH transmission would not be 5 consecutive slots but pseudo randomly selected 5 slots out of a further predefined number of consecutive slots (e.g., 15 slots).

It is noted that all embodiments of the present invention described above for the uplink control channel, e.g., the DPCCH, can be applied to any L1 control channel in the UL (carrying, e.g., pilot and/or power control information) used for, e.g., channel estimation and power control. It is also noted, that scheduling the discontinuous control signal can be performed by a user equipment or by a network element, according to embodiments of the present invention.

Figure 2:
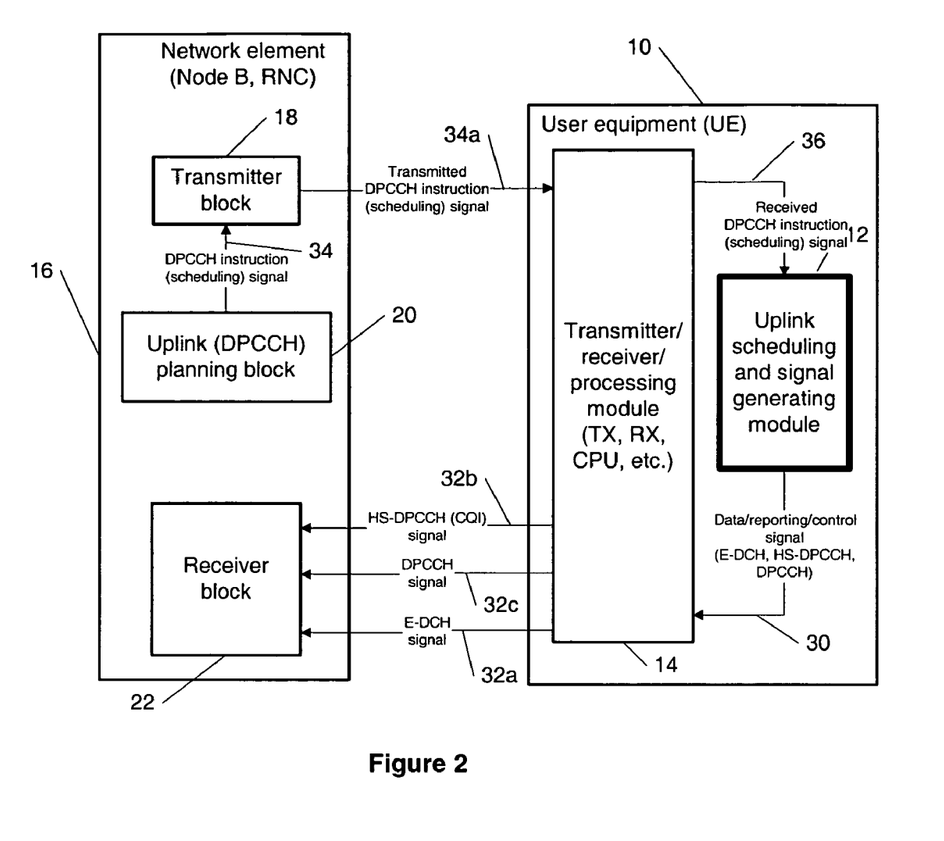
FIG. 2 is a block diagram which demonstrates defining dynamic gating of an uplink (UL) dedicated physical control channel (DPCCH), according to an embodiment of the present invention.

FIG. 2 shows a block diagram of an example among others which demonstrates defining dynamic gating of the uplink (UL) dedicated physical control channel (DPCCH), according to an embodiment of the present invention.

In the example of FIG. 2, a user equipment 10 comprises an uplink scheduling and signal generating module 12 and a transmitter/receiver/processing module 14. In one embodiment of the present invention, the module 12 can coordinate and originate steps performed by the user equipment 10 for defining the UL DPCCH. The user equipment 10 can be a wireless device, a portable device, a mobile communication device, a mobile phone, etc. In the example of FIG. 2, a network element 16 (e.g., a node B or a radio network controller, RNC) comprises a transmitter block 18, an uplink (DPCCH) planning module 20 and a receiver block 22. According to an embodiment of the present invention, the DPCCH planning module 20 can provide instructions (see signals 34, 34a and 36) to the user terminal 10, including (but not limited to): the minimum and maximum limits on the gap length of the UL DPCCH transmission, timing of the UL DPCCH transmission and gating, a duration of the UL DPCCH transmission, a maximum transmission gap in the discontinuous data signal still requiring an UL DPCCH transmission, a minimum transmission gap in the discontinuous data signal requiring continuous UL DPCCH transmission, the algorithm according to which the gap length in the discontinuous UL DPCCH transmission depends on the gap in the discontinuous data signal on the on the E-DCH 1, etc.

According to an embodiment of the present invention, the module 12 (the same is applicable to the module 20) can be implemented as a software or a hardware block or a combination thereof. Furthermore, the block 12 can be implemented as a separate block or can be combined with any other standard block of the user equipment 10 or it can be split into several blocks according to their functionality. The transmitter/receiver/processing block 14 can be implemented in a plurality of ways and typically can include a transmitter, a receiver, a CPU (central processing unit), etc. The module 14 provides an effective communication of the module 12 with the network element 16 as described below in detail. All or selected modules of the user equipment 10 can be implemented using an integrated circuit, and all or selected blocks of the network element 16 can be implemented using an integrated circuit as well.

The module 12 provides a data/reporting/control signal 30, according to embodiments of the present invention, which are then forwarded (signals 32a, 32b and 32c) to the receiver block 22 of the network element 16. Specifically, the module 12 provides a discontinuous data signal (e.g., an E-DCH signal 32a) and a discontinuous report signal (e.g., an HS-DPCCH signal 32b) containing channel quality indicator (CQI) reporting information regarding a DL channel. Also, the module 12 schedules a DPCCH signal 32c for the uplink (UL) dedicated physical control channel (DPCCH) gated depending on the instructions (using signal 36) provided by the network element 16 and on a transmission gap in the discontinuous data signal (e.g., transmitted on the E-DCH) using the predetermined criterion.

Alternatively, according to a further embodiment of the present invention, the scheduling of the gated DPCCH signal 32c described above can be completely or partly performed by the network element 16 such that the signals 34, 34a and 36 contain the scheduling instructions as well and forwarded to the user equipment 10 by the network element 16 as shown in FIG. 2.

It is noted that the network element 16, for the purposes of understanding of various embodiments of the present invention, can be broadly interpreted such that the network element 16 can comprise features attributed to both the Node B and the radio network controller (RNC). Specifically, the module 20 can be located in the RNC (then the signaling from the RNC is forwarded to the user equipment by the Node B) or in the Node B, whereas the block 22 is located in the Node B.

Figure 3:
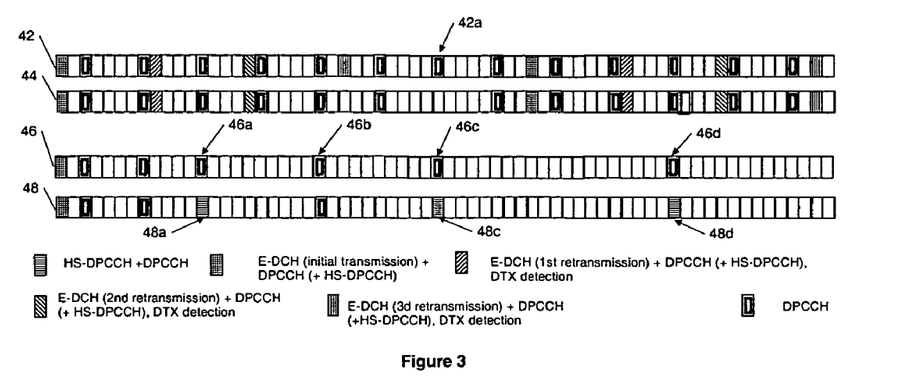
FIG. 3 is a diagram demonstrating examples of DPCCH gating patterns, according to embodiments of the present invention.

FIG. 3 shows one example among others of a diagram demonstrating DPCCH gating patterns, according to embodiments of the present invention. The granularity in this figure is 2 ms (equivalent to 3 WCDMA slots), i.e., it is assumed in this example that the duration of the DPCCH transmission is 2 ms even when not sent together with the E-DCH and/or HS-DPCCH transmission. As stated above, the duration of the DPCCH only transmissions can also be other than 2 ms (e.g., 1 or 2 slots, etc.).

Packet sequences 42, 44 and 46 correspond to a dynamic DPCCH gating pattern with the DPCCH (transmission) gating period of 10 ms when the UL is active (there is the E-DCH transmission), wherein the DPCCH gating period is doubled in length after every 2 gaps when the UL data transmission is inactive (there is no E-DCH transmission). The packet sequence 44 has less UL data transmission activities, therefore a 'slot' 42a representing the DPCCH signal in the packet sequence 42 is absent in the packet sequence 44 (according to the rules specified above). Furthermore, the packet sequence 46 has even less UL data transmission activity than the packet sequence 44, therefore the DPCCH signals in slots 46a, 46b, 46c and 46d are spaced in time according to a "double" rule specified above.

The packet sequence 48 corresponds to a dynamic DPCCH gating pattern with the DPCCH gating period of 10 ms when the UL is active, wherein the DPCCH gating period is doubled in length after every 2 gaps when the UL inactive and with a 40 ms CQI reporting period. The CQI reporting information is transmitted on the HS-DPCCH which also involves transmitting on the DPCCH at the same time, therefore it is necessary to send the DPCCH signals in slots 48a, 48c and 48d (compare with the packet sequence 46).

It is noted, that according to an embodiment of the present invention, the network element 16 can be aware (or informed) with rules for determining the DPCCH gating period by the user equipment 10, which may eliminate the need for a continuous DTX (discontinuous transmission) detection by the network element 16.

Figure 4:
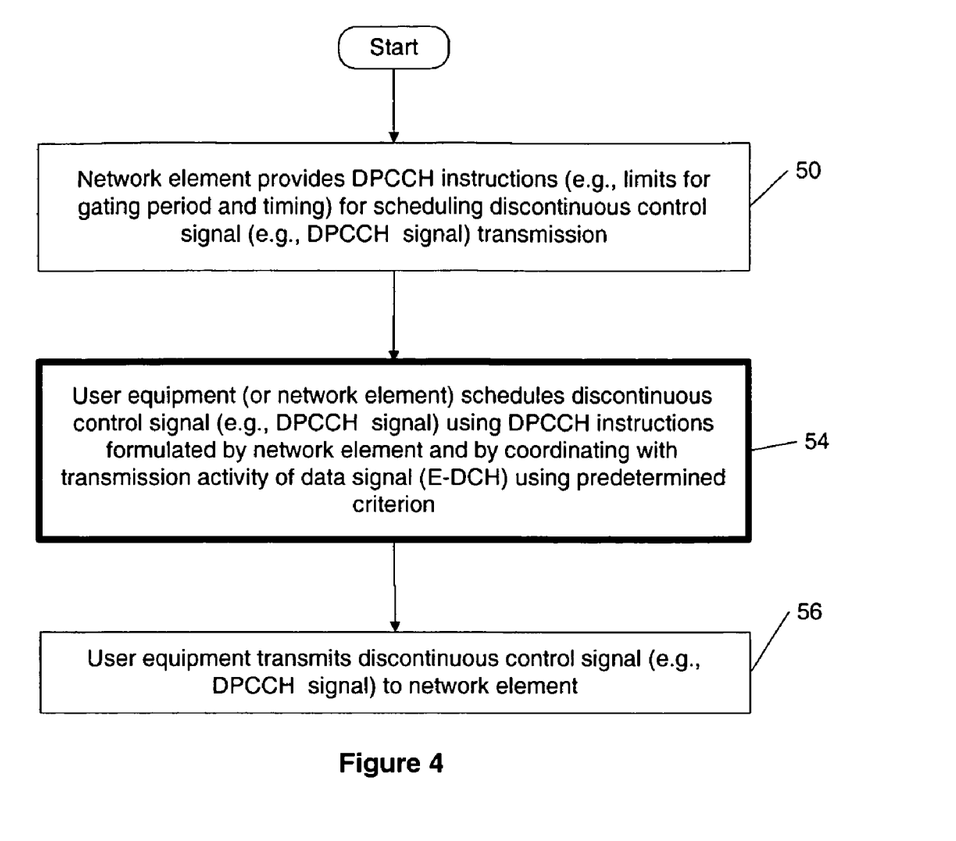
FIG. 4 is a flow chart which demonstrates defining dynamic gating of an uplink (UL) dedicated physical control channel (DPCCH), according to an embodiment of the present invention.

FIG. 4 is an example of a flow chart which demonstrates defining dynamic gating of the uplink (UL) dedicated physical control channel (DPCCH), according to an embodiment of the present invention.

The flow chart of FIG. 4 only represents one possible scenario among others. The order of steps shown in FIG. 4 is not absolutely required, so generally, the various steps can be performed out of order. In a method according to an embodiment of the present invention, in a first step 50, the network element 16 provides the DPCCH instructions (e.g., the algorithm according to which the transmission gap on the UL DPCCH depends on the data transmission gap on the E-DCH, the minimum and maximum limits on the gap length of the UL DPCCH transmission the timing of the transmission, the duration of the transmission, etc.) for the discontinuous control signal (e.g., the DPCCH signal) transmission. This step is typically implemented by using higher layer signaling, e.g., RRC (radio resource control) signaling. In a next step 54, the user equipment 10 (or alternatively the network element 16) schedules the discontinuous control signal using the DPCCH instructions (the signal 36) provided by the network element 16 and by coordinating with the transmission activity of the discontinuous data signal (E-DCH) using the predetermined criterion Finally, in a next step 56 the user equipment 10 transmits the discontinuous control signal (e.g., the DPCCH signal 32c) to the network element 32.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
    scheduling, using a predetermined criterion, a discontinuous control signal for an uplink control channel depending on instructions and on a transmission gap length in a discontinuous data signal on a data channel; and
    transmitting said discontinuous control signal to a network element by a user equipment,
    wherein said instructions comprise at least one of:
    a maximum limit for a gap period or a gap length for a control channel transmission,
    a minimum limit for a gap period or a gap length for a control channel transmission,
    timing of a control channel transmission,
    a duration of a control channel transmission,
    a maximum transmission gap in the discontinuous data signal on the data channel still requiring an uplink control channel transmission,
    a minimum transmission gap in the discontinuous data signal requiring a continuous control channel transmission, and
    an algorithm, according to which said discontinuous control signal for the uplink control channel depends on said discontinuous data signal on the data channel.

2. The method of claim 1, wherein said instructions are at least one of:
    predefined rules, and
    instructions provided by the network element.

3. The method of claim 1, wherein said discontinuous control channel is an uplink dedicated physical control channel and said data channel is an uplink enhanced dedicated channel.

4. The method of claim 1, wherein said network element is a Node B, and said network element and said user equipment are configured for wireless communications.

5. The method of claim 1, wherein during said scheduling, gating of said discontinuous control signal further depends on timing of a further report signal comprising channel quality indicator reporting information regarding a downlink channel and sent to said network element by said user equipment.

6. The method of claim 1, wherein during said scheduling, a gating period of said discontinuous control signal is changed by a pre-selected value after a pre-selected time period of a transmission inactivity of said discontinuous data signal, and after transmitting said discontinuous data signal again, said gating period is changed to its initial predefined value.

7. The method of claim 1, wherein during said scheduling, a gating period of said discontinuous control signal is increased by a pre-selected value after every pre-selected time period of a transmission inactivity of said discontinuous data signal, wherein said gating period cannot exceed a pre-selected maximum value.

8. The method of claim 1, wherein during said scheduling, a gating period of said discontinuous control signal is increased to a pre-selected maximum value after a pre-selected time period of a transmission inactivity of said discontinuous data signal.

9. The method of claim 1, wherein during said scheduling, a time duration of said discontinuous control signal is adjusted according to a further predetermined criterion.

10. The method of claim 1, wherein a time duration of said discontinuous control signal is increased by a pre-selected value after every pre-selected time period of a transmission inactivity of said discontinuous data signal, wherein said time duration cannot exceed a pre-selected maximum value.

11. The method of claim 1, wherein during said scheduling, a timing of gating of said discontinuous control signal relative to said discontinuous data signal is determined according to a predetermined algorithm and depends on said discontinuous data signal.

12. The method of claim 1, wherein a gating period of said discontinuous control signal is an average or a maximum allowed gap length in a randomized transmission pattern of said discontinuous control signal.

13. The method of claim 1, wherein said scheduling is provided by said network element or by said user equipment.

14. Apparatus comprising: a computer readable storage structure embodying a computer program code thereon for execution by a computer processor with said computer program code, wherein said computer program code comprises instructions for performing the method of claim 1.

15. A user equipment, comprising:
an uplink scheduling and signal generating module, configured to generate a discontinuous control signal for an uplink control channel;
a receiving/transmitting/processing module, configured to transmit said discontinuous control signal to a network element,
wherein scheduling of said discontinuous control signal is provided, using a predetermined criterion, depending on instructions and on a transmission gap length in a discontinuous data signal on a data channel,
wherein said instructions are received from the network element and comprise at least one of:
a maximum limit for a gap period or a gap length for a control channel transmission,
a minimum limit for a gap period or a gap length for a control channel transmission,
timing of a control channel transmission,
a duration of a control channel transmission,
a maximum transmission gap in the discontinuous data signal on the data channel still requiring an uplink control channel transmission,
a minimum transmission gap in the discontinuous data signal requiring a continuous control channel transmission, and
an algorithm, according to which said discontinuous control signal for the uplink control channel depends on said discontinuous data signal on the data channel.

16. The user equipment of claim 15, wherein said uplink scheduling and signal generating module is configured to provide said scheduling.

17. The user equipment of claim 15, wherein said scheduling is provided by said network element using said instructions.

18. The user equipment of claim 15, wherein said instructions are one of:
predefined rules, and
instructions provided by the network element.

19. The user equipment of claim 15, wherein said discontinuous control channel is an uplink dedicated physical control channel and said data channel is an uplink enhanced dedicated channel.

20. The user equipment of claim 15, wherein during said scheduling, gating of said discontinuous control signal further depends on timing of a further report signal comprising channel quality indicator reporting information regarding a downlink channel and sent to said network element by said user equipment.

21. The user equipment of claim 15, wherein during said scheduling, a gating period of said discontinuous control signal is changed by a pre-selected value after a pre-selected time period of a transmission inactivity of said discontinuous data signal, and after transmitting said discontinuous data signal again, said gating period is changed to its initial predefined value.

22. The user equipment of claim 15, wherein during said scheduling, a gating period of said discontinuous control signal is increased by a pre-selected value after every pre-selected time period of a transmission inactivity of said discontinuous data signal, wherein said gating period cannot exceed a pre-selected maximum value.

23. The user equipment of claim 15, wherein during said scheduling, a time duration of said discontinuous control signal is adjusted according to a further predetermined criterion.

24. The user equipment of claim 15, wherein during said scheduling, a timing of gating of said discontinuous control signal relative to said discontinuous data signal is determined according to a predetermined algorithm and depends on said discontinuous data signal.

25. The user equipment of claim 15, wherein a gaiting period of said discontinuous control signal is an average or a maximum allowed gap length in a randomized transmission pattern of said discontinuous control signal.

26. The user equipment of claim 15, wherein said user equipment is configured for wireless communications.

27. The user equipment of claim 15, wherein an integrated circuit comprises the uplink scheduling and signal generating module and the receiving/transmitting/processing module.

28. A user equipment comprising:
means for signal generation, for generating a discontinuous control signal for an uplink control channel;
means for receiving and transmitting, for transmitting said discontinuous control signal to a network element,
wherein scheduling of said discontinuous control signal is provided, using a predetermined criterion, depending on instructions and on a transmission gap length in a discontinuous data signal on a data channel, and
wherein said instructions are received from the network element and comprise at least one of:
a maximum limit for a gap period or a gap length for a control channel transmission,
a minimum limit for a gap period or a gap length for a control channel transmission,
timing of a control channel transmission,
a duration of a control channel transmission,
a maximum transmission gap in the discontinuous data signal on the data channel still requiring an uplink control channel transmission,
a minimum transmission gap in the discontinuous data signal requiring a continuous control channel transmission, and
an algorithm, according to which said discontinuous control signal for the uplink control channel depends on said discontinuous data signal on the data channel.

29. The user equipment of claim 28, wherein said means for signal generation is configured to provide said scheduling.

30. A network element, comprising:
a transmitter block, configured to transmit instructions for scheduling a discontinuous control signal for an uplink control channel to a user equipment; and
a receiving block, configured to receive a discontinuous data signal and said discontinuous control signal,
wherein scheduling of said discontinuous control signal is provided, using a predetermined criterion, depending on said instructions and on a transmission gap length in said discontinuous data signal on a data channel, and
wherein said instructions are received from the network element and comprise at least one of:
a maximum limit for a gap period or a gap length for a control channel transmission,
a minimum limit for a gap period or a gap length for a control channel transmission,
timing of a control channel transmission,
a duration of a control channel transmission,
a maximum transmission gap in the discontinuous data signal on the data channel still requiring an uplink control channel transmission,
a minimum transmission gap in the discontinuous data signal requiring a continuous control channel transmission, and
an algorithm, according to which said discontinuous control signal for the uplink control channel depends on said discontinuous data signal on the data channel.

31. A communication system, comprising:
a user equipment, configured to transmit a discontinuous control signal for an uplink control channel; and
a network element, configured to receive said discontinuous control signal, wherein scheduling of said discontinuous control signal is provided, using a predetermined criterion, depending on instructions and on a transmission gap length in a discontinuous data signal on a data channel,
wherein said instructions are provided by the network element and comprise at least one of:
a maximum limit for a gap period or a gap length for a control channel transmission,
a minimum limit for a gap period or a gap length for a control channel transmission,
timing of a control channel transmission,
a duration of a control channel transmission,
a maximum transmission gap in the discontinuous data signal on the data channel still requiring an uplink control channel transmission,
a minimum transmission gap in the discontinuous data signal requiring a continuous control channel transmission, and
an algorithm, according to which said discontinuous control signal for the uplink control channel depends on said discontinuous data signal on the data channel.

32. The system of claim 31, wherein said instructions are one of:
predefined rules, and
instructions provided by the network element.

33. The system of claim 32, wherein said scheduling is provided by said network element or by said user equipment.

* * * * *